US012677063B2

(12) United States Patent
Ohashi et al.

(10) Patent No.: US 12,677,063 B2
(45) Date of Patent: Jul. 7, 2026

(54) IMAGING DEVICE

(71) Applicant: Panasonic Intellectual Property Management Co., Ltd., Osaka (JP)

(72) Inventors: Kazuyuki Ohashi, Osaka (JP); Kazuhiro Ogawa, Osaka (JP); Tomonori Kono, Osaka (JP); Takashi Suzuki, Osaka (JP); Tetsuya Takeda, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 56 days.

(21) Appl. No.: 18/824,302

(22) Filed: Sep. 4, 2024

(65) Prior Publication Data

US 2025/0088738 A1     Mar. 13, 2025

(30) Foreign Application Priority Data

Sep. 12, 2023     (JP) ................................. 2023-147814

(51) Int. Cl.
H04N 23/65          (2023.01)
H04N 23/667          (2023.01)

(52) U.S. Cl.
CPC ........... H04N 23/65 (2023.01); H04N 23/667 (2023.01)

(58) Field of Classification Search
CPC .... H04N 23/65; H04N 23/667; H04N 23/651; H04N 23/73
See application file for complete search history.

(56) References Cited

U.S. PATENT DOCUMENTS

| | | | | |
|---|---|---|---|---|
| 6,903,778 B1 * | 6/2005 | Kaku | ................... | H04N 23/651 |
| | | | | 348/333.13 |
| 2020/0221008 A1 * | 7/2020 | Gandhi | ................. | H04N 23/65 |
| 2023/0370715 A1 * | 11/2023 | Suzuki | ................. | H04N 23/667 |
| 2024/0048865 A1 * | 2/2024 | Itoi | ........................ | H04N 23/65 |

FOREIGN PATENT DOCUMENTS

| | | | |
|---|---|---|---|
| JP | H3-213835 A | | 9/1991 |
| JP | H8-328701 A | | 12/1996 |
| JP | 2001268453 A | * | 9/2001 |
| JP | 2004153475 A | * | 5/2004 |
| JP | 2012133222 A | * | 7/2012 |

* cited by examiner

*Primary Examiner* — Timothy J Henn

(74) *Attorney, Agent, or Firm* — Renner, Otto, Boisselle & Sklar, LLP

(57) ABSTRACT

An imaging device includes: a mechanical shutter; a shutter driver that operates the mechanical shutter in a continuous shooting mode and a single shooting mode; a driving electric power supplier; and an undercut controller (undercut/driving electric power controller) that stops operation of the imaging device when a power supply voltage becomes lower than a predetermined undercut voltage. In the single shooting mode, the driving electric power supplier lowers a driving electric power and the undercut controller stops operation of the imaging device at a lower undercut voltage.

5 Claims, 2 Drawing Sheets

POWER SUPPLY VOLTAGE

Vuc1
Vuc2

TL1 TL2

TIME

SELECT STILL
PICTURE MODE

S1  SINGLE
SHOOTING
MODE?

NO

CONTINUOUS SHOOTING
MODE

YES SINGLE SHOOTING
MODE

S2  MECHANICAL SHUTTER
DRIVING VOLTAGE
DECREASE TIME: T2

S4  MECHANICAL SHUTTER
DRIVING VOLTAGE
DECREASE TIME: T1

S3  UNDERCUT VOLTAGE
THRESHOLD SETTING:
Vuc2

S5  UNDERCUT VOLTAGE
THRESHOLD SETTING:
Vuc1

IMAGING DEVICE

CROSS-REFERENCE TO RELATED APPLICATION

This application claims priority to Japanese Patent Application No. 2023-147814 filed on Sep. 12, 2023, the disclosure of which including the specification, the drawings, and the claims is hereby incorporated by reference in its entirety.

FIELD

The present disclosure relates to an imaging device including an imaging sensor and a mechanical shutter.

BACKGROUND

In general, for devices equipped with mechanical components that operate with application of electric power, techniques for properly stopping systems, that is, shutting down systems when the battery output voltage decreases to a predetermined shutdown voltage in order to avoid malfunction of the devices caused by a decrease in power supply voltage during operation are known (see, for example, Japanese Patent Application Publication No. 8-328701).

SUMMARY

The shutdown voltage as described above is set in accordance with the amount of decrease in power supply voltage during operation of mechanical components. In a case where the amount of decrease in the power supply voltage is large, the shutdown voltage is set at a relatively high level. This makes it difficult to prolong usable time of the device until shutdown.

It is therefore an object of the present disclosure to provide an imaging device capable of easily prolonging usable time of a device.

To achieve the object, the present disclosure provides an imaging device including: a mechanical shutter that is located between an optical system and an imaging sensor and controls light exposure and light shielding of the imaging sensor; a shutter driver that drives the mechanical shutter and operates the mechanical shutter in a continuous shooting mode in which the imaging sensor is repeatedly exposed to light and a single shooting mode in which the imaging sensor is exposed to light for each shot; a driving electric power supplier that supplies driving electric power to the shutter driver with electric power supplied from a power supply; and an undercut controller that stops operation of the imaging device when the power supply voltage supplied from the power supply becomes lower than a predetermined undercut voltage, wherein in the single shooting mode, the driving electric power supplier supplies a driving electric power lower than that in the continuous shooting mode, and in the single shooting mode, the undercut controller stops operation of the imaging device at an undercut voltage lower than that in the continuous shooting mode.

With this configuration, a decrease in power supply voltage in the single shooting mode is reduced so that usable time of the device can be easily prolonged.

DETAILED DESCRIPTION (Configuration of Main Portion Concerning Driving of Mechanical Shutter of Imaging Device)

Embodiments of the present disclosure will be described in detail with reference to the drawings.

Figure 1:
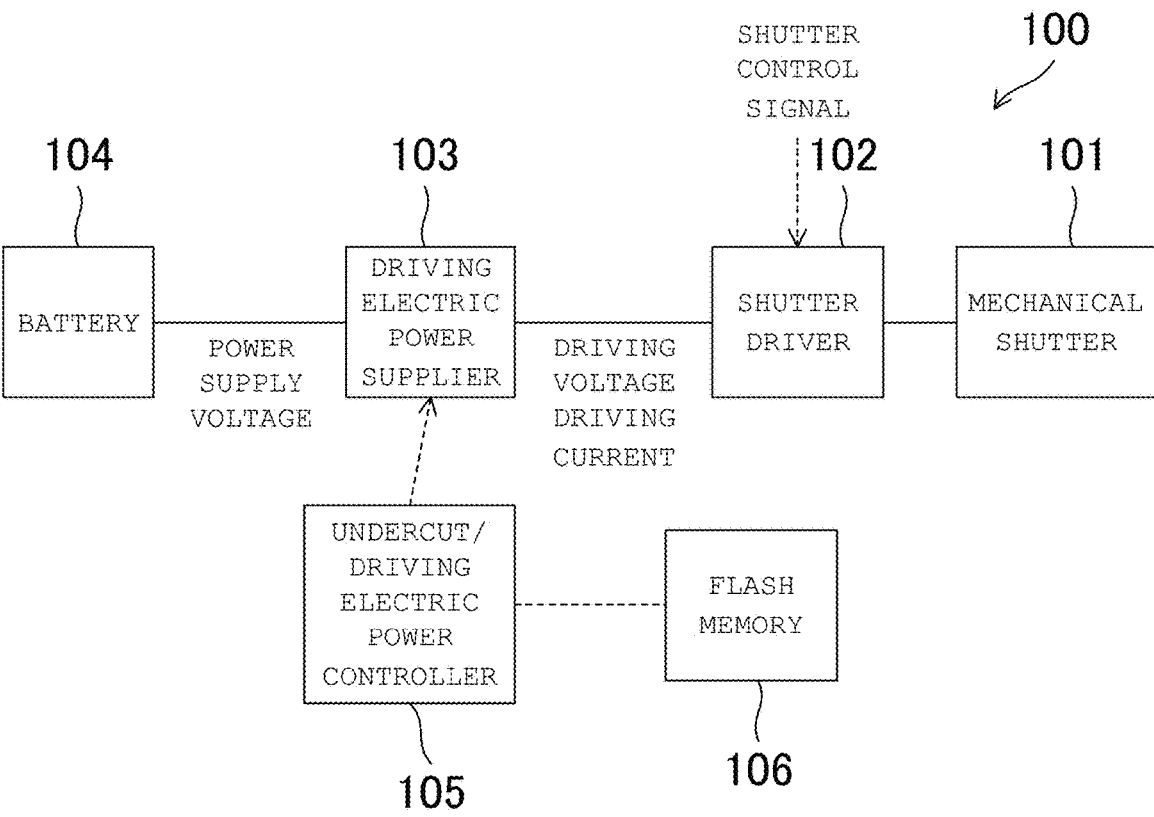
FIG. 1 is a block diagram illustrating a configuration of a main portion concerning driving of a mechanical shutter of an imaging device.

An imaging device 100 is a digital camera and, as illustrated in FIG. 1, includes a mechanical shutter 101, a shutter driver 102, a driving electric power supplier 103, a battery 104, an undercut/driving electric power controller 105, and a flash memory 106. The battery 104 may be a dry battery or a rechargeable battery.

The mechanical shutter 101 is located between an unillustrated optical system (optical system part) and an imaging sensor and controls light exposure and light shielding of an imaging sensor.

The shutter driver 102 drives the mechanical shutter 101 in response to a shutter control signal. More specifically, the shutter driver 102 operates the mechanical shutter 101 in a continuous shooting mode in which the imaging sensor is repeatedly exposed to light and a single shooting mode in which the imaging sensor is exposed to light for each shot.

The driving electric power supplier 103 supplies driving electric power to the shutter driver 102 with electric power supplied from the battery 104 as a power supply. More specifically, in the single shooting mode, driving electric power lower than that in the continuous shooting mode is supplied. Specifically, lowering of the driving electric power is performed in the single shooting mode by supplying driving current lower than that in the continuous shooting mode, for example. More specifically, for example, the lowering of the driving power is performed by lowering a driving voltage supplied to the shutter driver 102 by a predetermined amount from start of operation of the mechanical shutter 101 until a predetermined time has elapsed and by setting the predetermined time longer in the single shooting mode than in the continuous shooting mode.

If the predetermined time is increased in the continuous shooting mode, the number of shots that can be taken per second during high-speed continuous shooting decreases, leading to reduction in product competitiveness. In the single shooting mode, there is no limitation on the number of shots that can be taken per second. It is, therefore, possible to increase the time in which the driving voltage of the mechanical shutter 101 is lowered as compared to the continuous shooting mode without reducing product competitiveness.

The undercut/driving electric power controller 105 stops operation of the imaging device 100 when a power supply voltage supplied from the battery 104 becomes lower than a predetermined undercut voltage. The predetermined undercut voltage is set at such a level that operation of the imaging device 100 is stopped in the single shooting mode with an undercut voltage lower than that in the continuous shooting mode, for example.

The flash memory 106 stores voltage to be set as the undercut voltage beforehand.

(Operation of Imaging Device)

Figure 2:
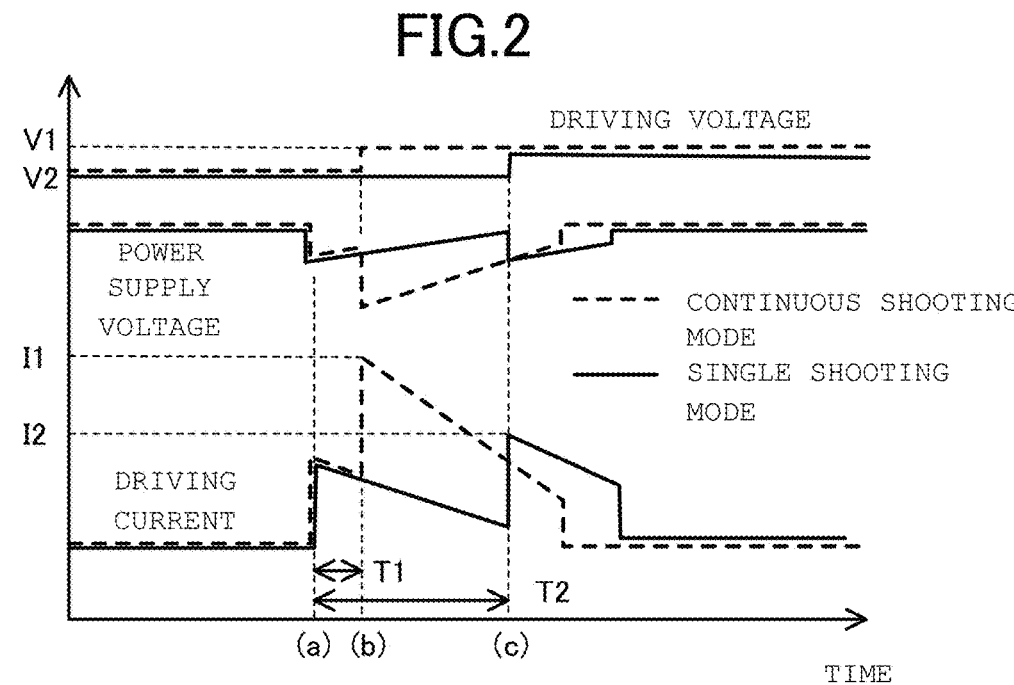
FIG. 2 is a graph showing a voltage and a current of each part during operation of the mechanical shutter.

In the imaging device 100 described above, the mechanical shutter 101 operates as shown in FIG. 2 in the continuous shooting mode and the single shooting mode. Here, in FIG. 2, the abscissa represents an elapsed time, and the ordinate represents a driving voltage, a power supply voltage, and a driving current.

(a) First, in starting driving of the mechanical shutter 101 in response to a control signal, the shutter driver 102 is supplied with a driving voltage V2 (e.g., V2: 5 V) lower than a steady driving voltage V1 (e.g., V1: 7.5 V) by a predetermined value. In this case, a current (supplied current) flowing in the shutter driver 102 (and flowing in the mechanical shutter 101 through the shutter driver 102) is reduced to be smaller than a current in the case of supplying the driving voltage V1. Regarding this current, a large break-in current temporarily flows, and then gradually decreases with time, for example.

(b) Next, in the case of the continuous shooting mode, after a lapse of time T1 (e.g., 2 ms), the driving voltage is raised from V2 to V1. In this case, a break-in current I1 (e.g., I1: 3.5 A) flowing in the shutter driver 102 as described above is reduced as compared to a case where the driving voltage V1 is supplied from the beginning in starting driving.

(c) In the case of the single shooting mode, after a lapse of time T2 (e.g., 10 ms), the driving voltage is raised from V2 to V1. In this case, as compared to the continuous shooting mode, a break-in current I2 (e.g., I2: 2.5 A) by supplying the driving voltage V2 is further reduced, and thus, even when the driving voltage is raised from V2 to V1, the amount of increase of current is kept small. Accordingly, the protection function against overcurrent of the battery 104 can be exerted.

Figure 3:
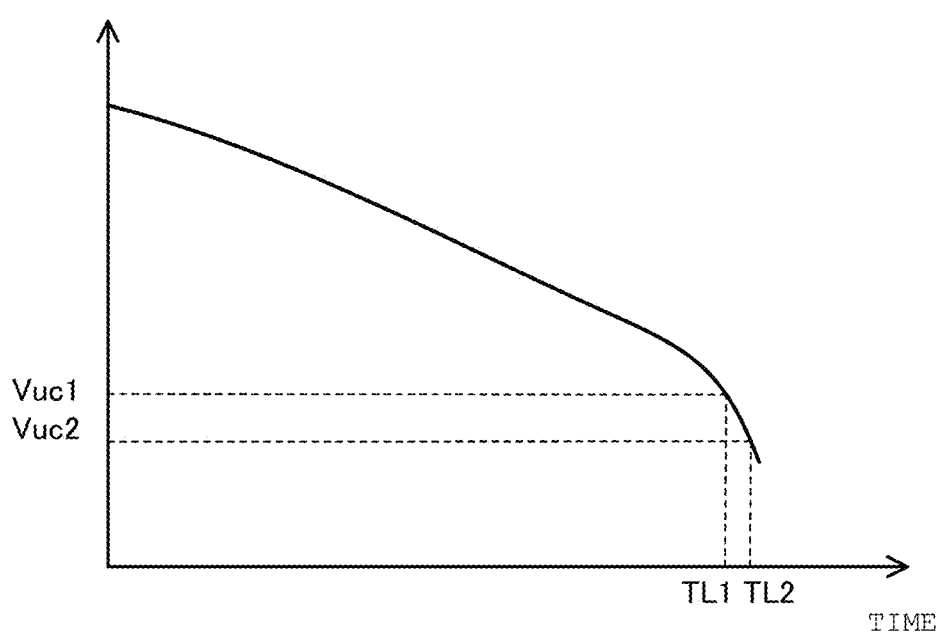
FIG. 3 is a graph showing a voltage change of a battery.

When the amount of increase of current flowing in the shutter driver 102 is kept small as described above, the amount of decrease of the power supply voltage supplied from the battery 104 is kept small accordingly. In view of this, to avoid malfunction occurring when the power supply voltage decreases in driving the mechanical shutter 101 as described above, the undercut voltage for stopping operation of the imaging device 100 is set to be different between the single shooting mode and a high-speed continuous shooting mode. Specifically, in a case where the power supply voltage under no load on the battery 104 gradually decreases with time as shown in FIG. 3, the undercut voltage is reduced from Vuc1 (e.g., 6.5 V) in the continuous shooting mode to Vuc2 (e.g., 6.1 V) in the single shooting mode, for example, so that a large number of shots that can be taken per second is kept in the continuous shooting mode, whereas the operating time is increased from TL1 to TL2, for example, to increase the number of shots that can be taken in the single shooting mode.

The times T1 and T2 in which the driving voltage is lowered to V2 and the undercut voltages Vuc1 and Vuc2 as described above are not particularly limited, and are stored in the flash memory 106 beforehand as shown in Table 1 below, and based on this, are controlled by the undercut/driving electric power controller 105.

TABLE 1

| Still picture mode | Mechanical shutter driving voltage decrease time (T1 < T2) | Undercut voltage threshold setting (Vuc1 > Vuc2) |
|---|---|---|
| Continuous shooting mode (driving electric power lowring degree is small) | T1 | Vuc1 |
| Single shooting mode | T2 | Vuc2 |

TABLE 1-continued

| Still picture mode | Mechanical shutter driving voltage decrease time (T1 < T2) | Undercut voltage threshold setting (Vuc1 > Vuc2) |
|---|---|---|
| (driving electric power lowring degree is large) | | |

Figure 4:
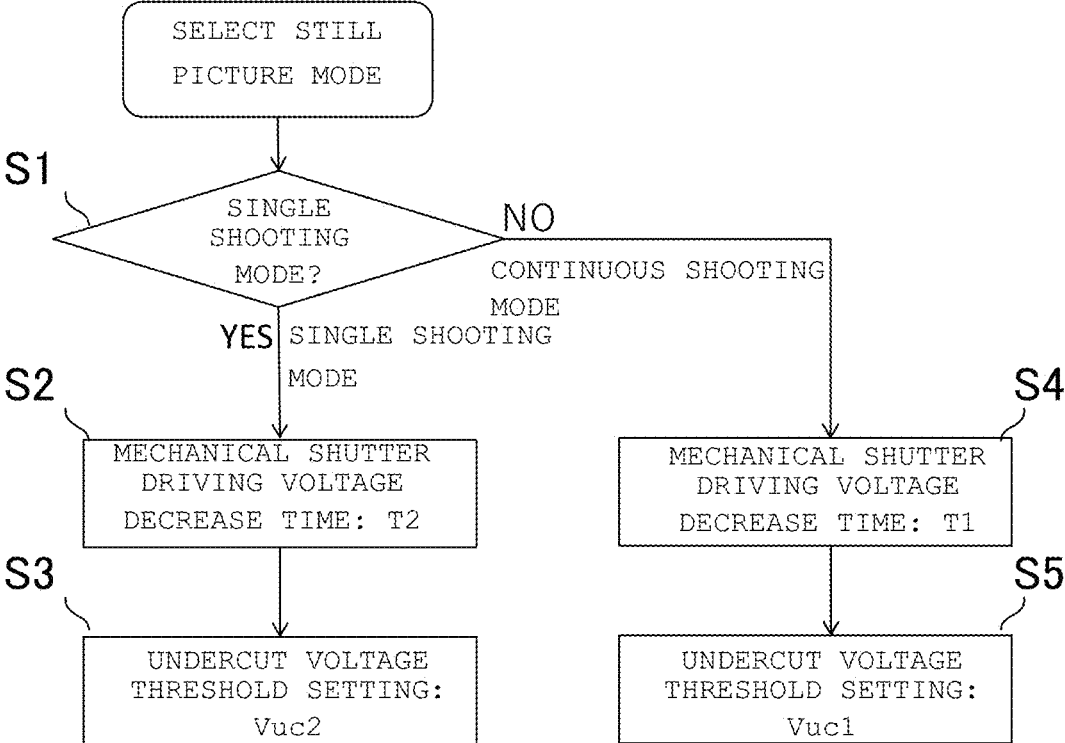
FIG. 4 is a flowchart showing a mechanical shutter driving voltage decrease time and operation of setting an undercut voltage.

The times T1 and T2 in which the driving voltage is lowered to V2 and the undercut voltages Vuc1 and Vuc2 as described above are set as shown in FIG. 4, for example.

(S1) When a still picture mode is selected by a user using an unillustrated operation unit, first, an unillustrated controller determines whether the current mode is a single shooting mode or not.

(S2, S3) If the controller determines that the current mode is a single shooting mode, the mechanical shutter driving voltage decrease time is set at T2 in the undercut/driving electric power controller 105, and the undercut voltage is set at Vuc2.

(S4, S5) On the other hand, if the controller determines that the current mode is a continuous shooting mode in S1, the mechanical shutter driving voltage decrease time is set at T1 in undercut/driving electric power controller 105, and the undercut voltage is set at Vuc1.

Based on these set values, the control described above is performed.

Other Matters

In addition to the configuration described above, the imaging device may include a remaining capacity detector that detects a remaining capacity of the battery 104 so that the time in which the driving voltage is lowered to V2 by the driving electric power supplier 103 can also be set based on the detected remaining capacity. Specifically, if there is a margin in the remaining capacity, the time in which the driving voltage is lowered may be reduced to increase the imaging frame speed, for example.

Although the embodiment described above is directed to the example in which the imaging device is a digital camera, the present disclosure is not limited to this example. It is sufficient that the imaging device according to the present disclosure is electronic equipment having an image pickup function (e.g., video camera, smartphone, tablet terminal, etc.).

What is claimed is:

1. An imaging device comprising:
a mechanical shutter that is located between an optical system and an imaging sensor and controls light exposure and light shielding of the imaging sensor;
a shutter driver that drives the mechanical shutter and operates the mechanical shutter in a continuous shooting mode in which the imaging sensor is repeatedly exposed to light and a single shooting mode in which the imaging sensor is exposed to light for each shot;
a driving electric power supplier that supplies driving electric power to the shutter driver with electric power supplied from a power supply; and
an undercut controller that stops operation of the imaging device when the power supply voltage supplied from the power supply becomes lower than a predetermined undercut voltage, wherein
in the single shooting mode, the driving electric power supplier supplies a driving electric power lower than that for each shot in the continuous shooting mode, and in the single shooting mode, the undercut controller stops operation of the imaging device at an undercut voltage lower than that in the continuous shooting mode.

2. The imaging device according to claim 1, wherein in the single shooting mode, the driving electric power supplier supplies a driving current lower than that for each shot in the continuous shooting mode.

3. The imaging device according to claim 2, wherein the driving electric power supplier lowers a driving voltage to be supplied to the shutter driver by a predetermined amount from start of operation of the mechanical shutter until a predetermined time has elapsed and sets the predetermined time longer in the single shooting mode than in the continuous shooting mode.

4. The imaging device according to claim 3, wherein the power supply is a battery, the imaging device further comprises a remaining capacity detector that detects a remaining capacity of the battery, and the driving electric power supplier also sets the predetermined time based on the remaining capacity.

5. An imaging device comprising:

an imaging sensor that captures an object image through an optical system and generates image data;

a mechanical shutter that is located between the optical system and the imaging sensor and controls light exposure and light shielding of the imaging sensor;

a shutter driver that drives the mechanical shutter and operates the mechanical shutter in a continuous shooting mode in which the imaging sensor is repeatedly exposed to light and a single shooting mode in which the imaging sensor is exposed to light for each shot; and a driving electric power supplier that supplies driving electric power to the shutter driver with electric power supplied from a power supply, wherein the driving electric power supplier lowers a driving voltage to be supplied to the shutter driver by a predetermined amount from start of operation of the mechanical shutter until a predetermined time has elapsed and sets the predetermined time longer in the single shooting mode than in the continuous shooting mode.

* * * * *